June 8, 1954  R. E. SKINNER ET AL  2,680,772
METHOD FOR PRODUCING PORCELAIN ENAMEL
Original Filed Dec. 2, 1950  4 Sheets-Sheet 1

INVENTORS
ROBERT J. SKINNER AND
BY GLENN H. MCINTYRE
Oberlin & Limbach
ATTORNEYS.

June 8, 1954 R. E. SKINNER ET AL 2,680,772
METHOD FOR PRODUCING PORCELAIN ENAMEL
Original Filed Dec. 2, 1950 4 Sheets-Sheet 3

INVENTORS
ROBERT J. SKINNER AND
BY GLENN H. McINTYRE

Oberlin + Limbach
ATTORNEYS.

INVENTORS
ROBERT J. SKINNER AND
BY GLENN H. McINTYRE
Oberlin & Limbach
ATTORNEYS.

Patented June 8, 1954

2,680,772

UNITED STATES PATENT OFFICE 2,680,772

METHOD FOR PRODUCING PORCELAIN ENAMEL

Robert E. Skinner, Fairview Park, and Glenn H. McIntyre, Cleveland Heights, Ohio, assignors to Ferro Corporation, a corporation of Ohio Original application December 2, 1950, Serial No. 198,790, now Patent No. 2,640,859, dated June 2, 1953. Divided and this application July 28, 1951, Serial No. 239,108

4 Claims. (Cl. 13—34)

This invention is a division of our pending application Serial Number 198,790 filed December 2, 1950, now Patent No. 2,640,859, issued June 2, 1953.

This invention relates as indicated to smelters for porcelain enamel frit characterized particularly in that the raw batch components from which the frit is eventually produced are melted by passing electric current through the mass so that the batch is heated as a result of its own internal electrical resistance.

The use of electric smelters for the purpose of reducing various types of raw materials to a molten state is quite old, and to a minor degree that type of heating has been employed for the production of conventional glass.

Porcelain enamel is, however, a very complex mixture of various metallic oxides and the like so that frequently the silica content of the batch is only a minor proportion of the total. It has been the general practice in most electrically heated glass tanks to deposit the raw material centrally of the tank with electrodes spaced rather uniformly about the space occupied by the batch and to then provide a submerged outlet leading to a fining chamber from which the glass is ultimately discharged. We have found that none of those glass tanks are suitable for the smelting of porcelain enamel frit in the most efficient manner. Whereas these previously used glass tanks have been patterned largely after the general principle of construction of electric furnaces employed, for example, in the smelting of metals, it has been necessary to deviate sharply from the general type of construction in providing a smelter which could be used successfully for the production of porcelain enamel.

It is a principal object of our invention to provide a method of operating a smelter of the character described which not only produces a porcelain enamel frit of the desired degree of homogeneity but which is also economical not only from the standpoint of its cost of operation, but also from the standpoint of loss of raw material.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments in the smelter which is operated according to the invention, these being indicative, however, of but a few of the various ways in which the principle of the invention may be employed.

Figure 1:
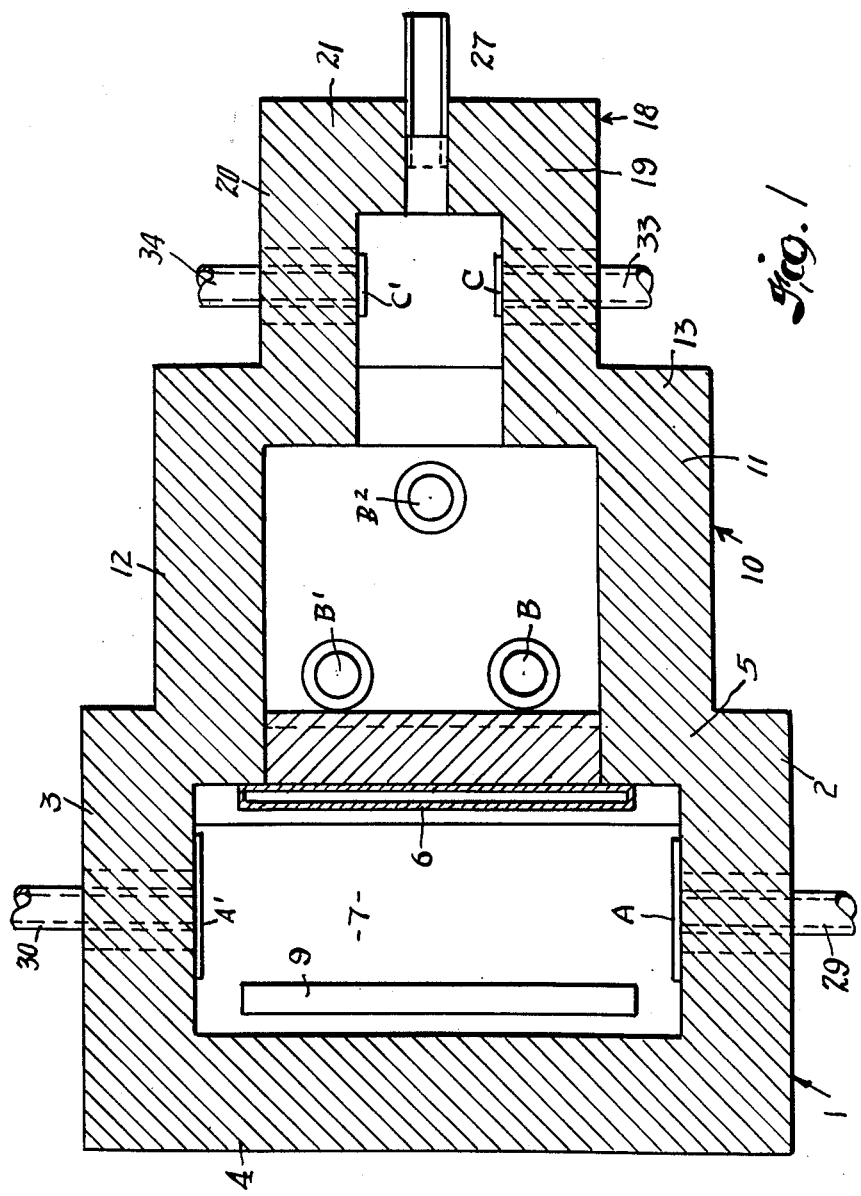
Fig. 1 is a top plan view of a smelter constructed for operation in accordance with the principles of our invention, but in which the roof structures are shown removed for more clear illustration of the internal structure of the smelter.
Figure 2:
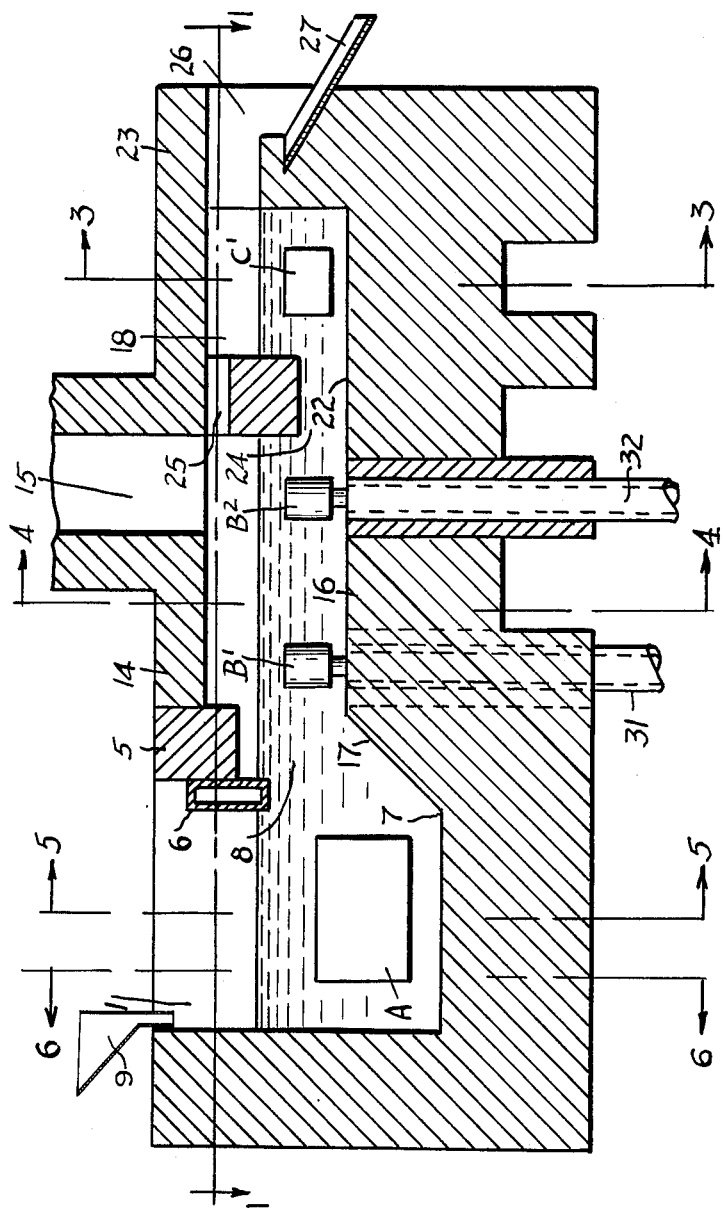
Fig. 2 is a longitudinal vertical section view of the smelter illustrated in Figure 1.
Figure 3:
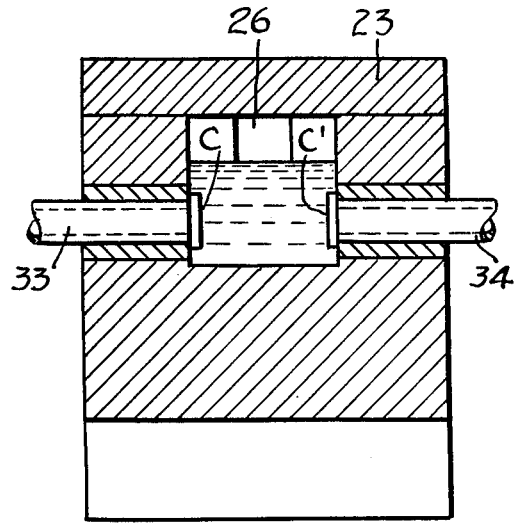
Fig. 3 is a transverse vertical section view of the smelter illustrated in the previous figures taken on the plane substantially indicated by line 3—3 in Figure 2.
Figure 4:
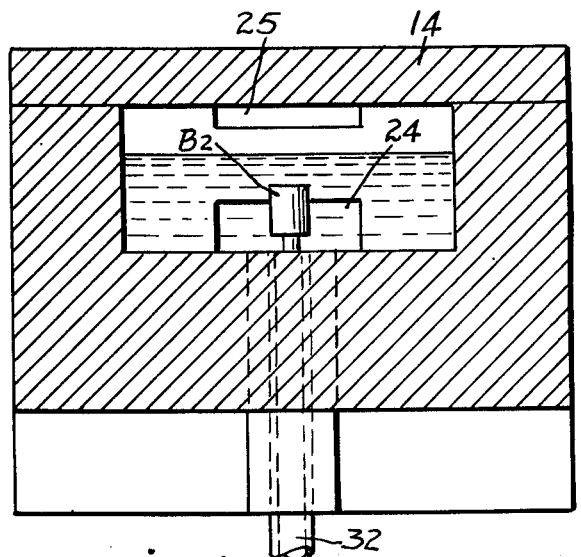
Fig. 4 is a cross section on the line 4—4 of Figure 2.
Figure 5:
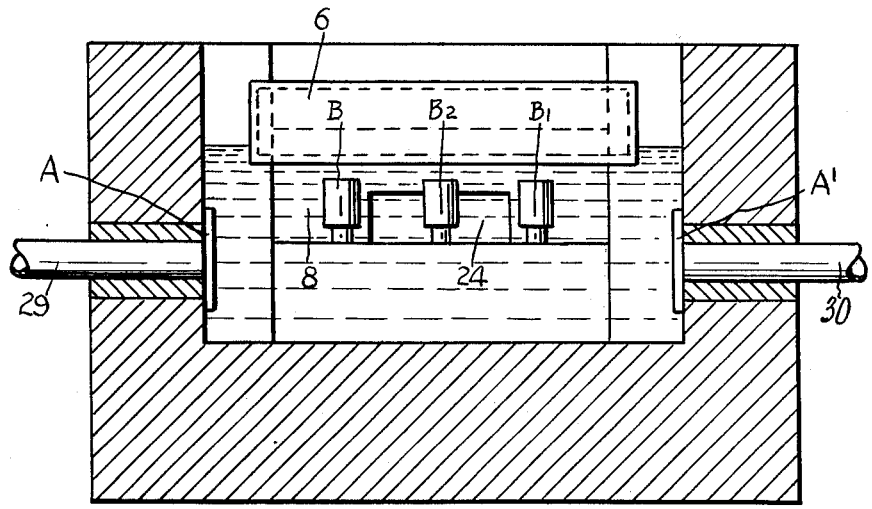
Fig. 5 is a transverse section view of the smelter illustrated in previous figures taken on the plane substantially indicated by line 5—5 of Figure 2.

Referring more specifically to the drawings and more especially to Figs. 1 and 2, the smelter herein illustrated comprises a substantially rectangular lined melting chamber generally indicated at 1 which is formed of two vertical side walls 2 and 3 and first and second end walls 4 and 5 said second end wall 5 extending downwardly and terminating about the normal bath level. Adjacent end wall 5 there is provided a hollow skimmer wall 6, through which a cooling medium such as water may be circulated, and which extends downwardly terminating slightly below the normal bath level. The hearth 7 of the melting chamber is arranged at a level substantially lower than the hearth of the remaining portion of the smelter.

The material to be melted is fed to the melting chamber by feeder 9 which is situated on the lateral axis of said melting chamber opposite skimmer wall 6. In the preferred embodiment of our invention the feeder 9 is substantially of the same width as the inside dimension of said melting chamber and is so constructed as to continuously deliver a relatively thin layer of raw batch across the surface of the molten bath. In this manner the molten bath is continually covered with a blanket of raw batch thus eliminating the necessity of a roof over that portion of the smelter, since the covering of raw material acts as an insulating blanket preventing loss of heat and fumes. However, if wanted or deemed necessary it is entirely within the contemplation of the present invention to provide a roof for the melting chamber.

In the position adjacent the chamber which was just described is a smelting chamber generally indicated at 10, which as most clearly illustrated in Figure 1 comprises side walls 11 and 12 and end wall 13, the wall 5 of the melting chamber also acting as an end wall for the smelting chamber 10. Supported on the walls is a roof 14 which may be arched or flat and which is provided with a stack opening 15. The floor of the smelting chamber indicated at 16 is, as previously mentioned, at an elevation which is substantially higher than the bottom of the melting chamber. The edge of the floor of the smelting chamber adjacent the passageway 8 through which the preliminarily melted material as received by the smelting chamber from the melting chamber is relieved as at 17 in order to reduce floor resistance.

It is necessary at this time to note three important features of the smelter of the present invention. First, as previously pointed, the melting chamber is provided with a bottom which is substantially lower than the floor of the remaining portion of the smelter. This construction serves the important purpose of allowing the melting material to circulate thus promoting homogenization of the many different ingredients which go to make up a porcelain enamel. Secondly, the melting material as it circulates, comes up under the skimmer wall thus skimming the unmelted material and preventing it from being carried over into the smelting chamber. The next important feature is the relatively large diameter passageway between the melting and smelting chambers. One of the big troubles in making an electric smelter for the production of porcelain enamel is the prevention of a crust formation over the top of the melting raw batch. The crust is formed by the escaping volatiles and heated gases. Since the raw batch is heated from the bottom up and there is a minimum of heat at the extreme top of the raw batch, the escaping volatiles tend to solidify at the top of the raw batch forming a crust, and the crust in turn prevents incoming raw materials from reaching the lower hot zone of the melting chamber. However, with the relatively large passageway between the melting and smelting chambers there is ample room for the passage of the volatiles and heated gases to pass unimpeded towards the stack opening. The stack opening being situated at the end of the smelting chamber furthest from the melting chamber causes a draft which sucks the volatiles and heated gases towards itself and thus substantially prevents the volatiles from trying to escape through the layer of unmelted raw material.

The third important feature of the present invention is the provision of separate melting and smelting chambers. In the previous methods of electrically melting porcelain enamel the melting and smelting of the raw ingredients were carried on in the same chamber. This necessitated retaining the melted ingredients in the combined melting and smelting vault for a relatively long time until it was sufficiently smelted to go into the final fining and discharge chamber. However, with the arrangement of the present invention the raw material is preliminarily melted in the first or melting chamber and is received by the smelting chamber in a substantially completely molten condition, here the material because of its molten state is quickly and readily smelted to substantial completeness, when it then is carried into the final fining and discharge chamber where it only has to remain a relatively very short time. Furthermore by the time porcelain enamel passes through the final chamber where it receives its final fining it is virtually impossible for the discharging porcelain enamel to contain any unmelted material. We have found that by the use of a smelter of this type we have been able to at least double production using the same electrical input and surface area as used with previous smelters.

Adjacent the smelting chamber last described is a fining and discharge chamber generally indicated at 18 which comprises side walls 19 and 20 and end wall 21, the wall 13 of the smelting chamber also acting as an end wall for the fining and discharge chamber 18. The floor of the fining and discharge 22, as previously stated is on the same level as the floor of the smelting chamber 10. Supported on the walls of the chamber 18 is a roof 23 which may be arched or flat.

The submerged passage 24 which connects the smelting chamber 10 and the fining chamber 18 is so constructed as a last precaution against any unmelted material passing into the final chamber.

The principal gases which pass upwardly through the stack are the air streams which enter the smelter through its openings. In this connection any air which enters the fining and discharge chamber passes through the passageway 25 which is formed on the axial line of the smelter directly above passageway 24. It will thus be observed that the flow of gases or heated air is substantially counter-current to the flow of the molten porcelain enamel. This is important since this sweep of air precludes any unsmelted finely divided material finding its way into the fining and discharge chamber through the passageway 25 which is formed on the axial line of the smelter directly above passageway 24.

In the wall 21 of the fining and discharge chamber 18 there is provided a passage 26 on the longitudinal axis of the smelter through which the finished material is discharged over a trough like extension 27 which permits the finished material to drop vertically either into a water bath or into the space between parallel quenching rolls as illustrated in U. S. Patent No. 2, 294,828. The entire body of the smelter is preferably formed of refractory material usually used in the construction of equipment of this kind. It is well-known, of course, that in such construction the body of the structure is made of appropriate refractory blocks and the surfaces such as the hearth of the melting chamber, the side walls of the smelting and fining chamber and the floors of the chambers are all lined with special refractories, particularly suited to withstand attack from the material produced by the smelter. The details of such construction which is indicated as conventional in the art have not been shown.

Figure 6:
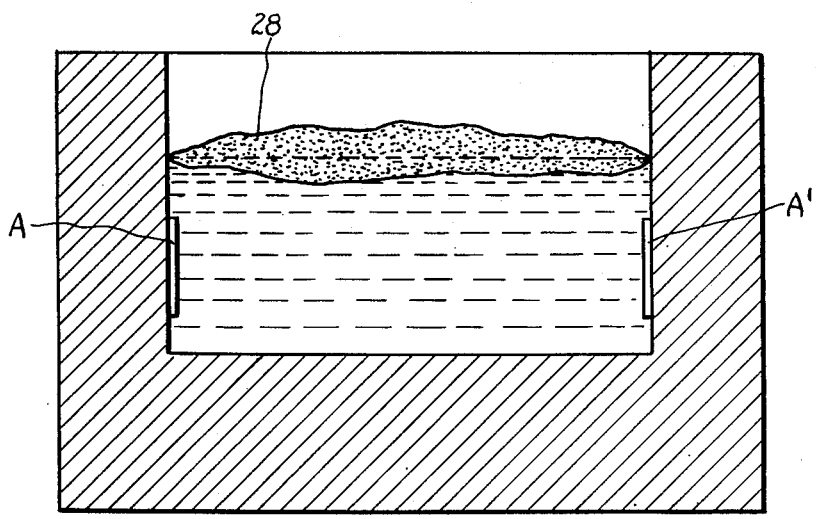
Fig. 6 is a transverse section view of the smelter illustrated in previous figures taken on the plane substantially indicated by line 6—6 of Figure 2.

The in-coming raw material is fed into the smelter, by feeder 9, at a rate substantially equal to the discharge rate of finished molten material. As best shown in Fig. 6 the raw material 28 is deposited into the melting chamber in an even relatively thin layer with no piling up of raw material in the center and with a minimum of raw material pushing under the surface of the molten material. This method of feeding forms an adequate insulating blanket over the molten material present in the melting chamber while at the same time affording ease in melting.

The raw material is reduced to finished form by being heated electrically by its own internal resistance. This is accomplished by the arrangement in the smelter of a plurality of electrodes.

The first pair of such electrodes comprises those indicated at A and A' which are substantially rectangular plates supported by being secured to the inner ends of rods 29 and 30 respectively. The latter rods project outwardly through openings provided therefore in the walls 2 and 3. The openings through which the supporting rods thus pass are well below the bath level in the smelter, thus insuring that the electrodes will not become oxidized since they are at all times covered with molten material. Rods 29 and 30 which conduct current to electrodes A and A' are cooled as by water. A layer of chilled material surrounds the cooled pipes at the point where they are inserted through the walls of the smelter, thus preventing the molten material from seeping out. The current path between electrodes A and A' is transverse to the flow of molten material.

As best shown in Fig. 1, three vertical electrodes supply current to the molten material in the second or smelting chamber. These electrodes designated at B, $B^1$ and $B^2$ are projected upwardly through the floor of the chamber. Current from a 3 phase delta source is conducted to these electrodes through water cooled rods indicated at 31 and 32. While it is entirely within the contemplation of the present invention to use a plurality of paired electrodes in the smelting chamber, in the preferred embodiment of our invention we use the above mentioned three phase system. When using the three phase system we have found that a "hot" spot occurs approximately in the center of the triangle formed by the electrodes. This "hot-spot" condition causes a mechanical turbulence of the molten material which tends to break up any crust formation. As best shown in Fig. 1 the electrodes B, $B^1$ and $B^2$ are spaced substantially equidistant from each other forming an equilateral triangle. Therefore the current in passing from one electrode to the next forms a path which is approximately circular in a horizontal plane. As previously mentioned there is a "hot" spot formed approximately in the center of the electrodes. Since the "hot" spot cannot be readily dissipated the molten material closest to this spot becomes hotter than the surrounding material causing it to rise, and thus causing the molten material to circulate in a vertical plane. It can now be seen that a stirring action is set up whereby the formation of a crust is held at an absolute minimum. The formation of a crust is so highly undesirable that the aforementioned system of electrodes is preferred as added insurance.

The final set of electrodes indicated at C and C' are arranged in walls 19 and 20 below the bath level. Current is supplied to these electrodes through water cooled rods 33 and 34, as in electrodes A and A' from a single phase circuit. It will be noted that these electrodes C and C' are closely adjacent to the passage 24 in order to maintain the bath in a highly fluid state and also as added insurance that any material which may not have been fully smelted will be fined to the proper degree before passing through discharge passage 26.

In the preferred embodiment of our invention we use a separate circuit and transformer for each set of electrodes in each of the chambers. In this manner the electrical input of each chamber is controlled according to individual need.

In the selection of the material from which the electrodes are to be made care should be exercised in order to prevent their reduction by the material being smelted. It has been found that the material from which are made those portions of the electrodes which are actually in contact with the material being smelted should be lower in the electromotive series than the materials which are present in the raw batch in the form of oxides. Thus, for example, when smelting a frit batch containing substantial amounts of zirconium, it is desirable to use an electrode made of molybdenum. While graphite electrodes can be used, especially when smelting certain types of porcelain enamel such as ground coat enamels containing substantial amounts of cobalt and nickel oxides, best results will be secured by the use of metallic electrodes selected in the manner described.

A further feature of our construction is the arrangement of the flue or stack passage. In this connection it will be observed that the main stack is located at the discharge end of the smelting chamber. In this position the stack causes a draft strong enough to draw the volatiles and heated gases through passageway 8 while simultaneously affording a draft to sweep out the heated gases from chamber 18 thus preventing the possibility of any finely divided material from entering chamber 18.

In the preferred embodiment of our invention we maintain a temperature differential between the melting and smelting chambers. By the use of the separate circuits for each chamber we are able to maintain the overall temperature of the smelting chamber of from about 50° F. to about 150° F. higher than the overall temperature of the melting chamber. As previously pointed out the smelter is so constructed as to allow the volatiles and heated gases to pass unimpeded from the melting to the smelting chamber. By maintaining the above mentioned temperature differential we have found that a turbulence is set up between the two chambers, which turbulence acts as a means for causing the volatiles and heated gases to be carried over from the melting to the smelting chamber and the higher temperature of the smelting chamber causes the volatiles and heated gases to rise to the surface where they are carried off by the effects of the stack.

It is preferable to provide a stack height as compared with the other critical factors so that the stack just above the roof of the smelter has at least a slight negative pressure. Since the smelting operation is performed by the passage of current through the mass, there is very little loss of raw material as by decomposition, which must be carried away by the stack. In this connection it is a notable feature of our invention that by heating the raw material by the passage of current therethrough there is very considerably less loss of raw materials due to decomposition than in the other types of conventional smelting wherein the mass is heated by a flame. Actually, in the case of fluorine, for example, it will be found that for a given fluorine content in the resultant frit, the fluorine contained in the raw batch fed to the electric smelter must be considerably less than in the raw batch smelted by means of a flame. It has been shown by actual analysis that only about $\frac{1}{3}$ as much fluorine is lost when operating our electric smelter as occurs when smelting the same raw batch mixture by means of a flame.

Other modes of applying the principle of the invention may be employed, change being made as regards the details described, provided the features stated in any of the following claims or the equivalent of such be employed.

We therefore particularly point out and distinctly claim as our invention:

1. The method of continuously producing porcelain enamel frit from a dry admixture of raw materials which comprises feeding the raw mix continuously to a melting bath, said bath being substantially deeper than two subsequent baths, preliminarily melting the raw materials in said melting bath by the passage of electric current therethrough, near the bottom thereof, whereby substantial convection flow in such bath is maintained due to temperature differences between vertical portions thereof, skimming back the surface of the bath as it flows to a second and substantially shallower bath wherein the preliminarily melted ingredients are smelted substantially to completion by the passage of electric current therethrough, withdrawing the smelted enamel at a point substantially below the surface of said second bath, fining the smelted enamel in a third bath said third bath being of substantially the same depth as said second bath, and finally discharging and fritting said fined enamel.

2. The method of continuously producing porcelain enamel frit from a dry admixture of raw materials which comprises feeding the raw mix continuously to a melting bath, said bath being substantially deeper than two subsequent baths, preliminarily melting the raw materials in said melting bath by the passage of electric current therethrough, near the bottom thereof, whereby substantial convection flow in such bath is maintained due to temperature differences between vertical portions thereof, skimming back the surface of the bath as it flows to a second and substantially shallower bath wherein the preliminarily melted ingredients are smelted substantially to completion by the passage of electric current therethrough, whereby substantial convection flow is maintained in said second bath due to temperature differences between horizontal portions thereof, withdrawing the smelted enamel at a point substantially below the surface of said second bath, fining the smelted enamel in a third bath said third bath being of substantially the same depth as said second bath, and finally discharging and fritting said fined enamel.

3. The method of continuously producing enamel frit from a dry admixture of raw materials which comprises feeding the raw mix continuously to a melting bath, said bath being substantially deeper than two subsequent baths, preliminarily melting the raw materials in said melting bath by the passage of electric current therethrough, near the bottom thereof, whereby substantial convection flow in such bath is maintained due to temperature differences between vertical portions thereof, wherein the flow of hot gases and volatile material is in the same direction as the flow of molten material, skimming back the surface of the bath as it flows to a second and substantially shallower bath wherein the preliminarily melted ingredients are smelted substantially to completion by the passage of electric current therethrough, whereby substantial convection flow is maintained in said second bath due to temperature differences between horizontal portions thereof, withdrawing the smelted enamel at a point substantially below the surface of said second bath, fining the smelted enamel in a third bath said third bath being of substantially the same depth as said second bath, and finally discharging and fritting said fined enamel.

4. The method of continuously producing porcelain enamel frit from a dry admixture of raw materials which comprises feeding the raw mix continuously to a melting bath, said bath being substantially deeper than two subsequent baths, preliminarily melting the raw materials in said melting bath by the passage of electric current therethrough near the bottom thereof, whereby substantial convection flow in such bath is maintained due to temperature differences between vertical portions thereof, wherein the flow of hot gases and volatile material is in the same direction as the flow of molten material, skimming back the surface of the bath as it flows to a second and substantially shallower bath, wherein the overall temperature is substantially higher than the overall temperature of said melting bath, smelting the preliminarily melted material to substantial completeness by the passage of electric current therethrough, whereby substantial convection flow is maintained in said smelting bath due to temperature differences between horizontal portions thereof, withdrawing the smelted enamel at a point substantially below the surface of said smelting chamber, fining the smelted enamel to completeness in a third bath, said third bath being substantially the same depth as said second bath, and finally discharging and fritting said fined enamel.

References Cited in the file of this patent

UNITED STATES PATENTS

| Number | Name | Date |
|---|---|---|
| 1,820,248 | Raeder | Aug. 25, 1931 |
| 1,944,855 | Wadman | Jan. 23, 1934 |
| 1,956,171 | Hitner | Apr. 24, 1934 |
| 2,089,690 | Cornelius | Aug. 10, 1937 |
| 2,122,469 | Hitner | July 5, 1938 |
| 2,198,304 | Cornelius | Apr. 23, 1940 |
| 2,262,069 | Turk | Nov. 11, 1941 |
| 2,283,188 | Cornelius | May 19, 1942 |
| 2,294,828 | Boyd et al. | Sept. 1, 1942 |
| 2,471,531 | McIntyre et al. | May 31, 1949 |
| 2,527,144 | Meacham et al. | Oct. 24, 1950 |
| 2,559,683 | Skinner et al. | July 10, 1951 |
| 2,610,217 | Skinner et al. | Sept. 9, 1952 |
| 2,640,859 | Skinner et al. | June 2, 1953 |